US012611965B2

(12) United States Patent
Jeong et al.

(10) Patent No.: US 12,611,965 B2
(45) Date of Patent: Apr. 28, 2026

(54) VEHICLE INCLUDING DC-DC CONVERTER AND METHOD OF CONTROLLING FOR THE SAME

(71) Applicants: Hyundai Motor Company, Seoul (KR); Kia Corporation, Seoul (KR)

(72) Inventors: Jae Hun Jeong, Anyang-si (KR); Kyu Won Jeong, Hwaseong-si (KR); Beom Sik Kim, Gwangmyeong-si (KR); Mun Soo Chung, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 446 days.

(21) Appl. No.: 18/117,697

(22) Filed: Mar. 6, 2023

(65) Prior Publication Data

US 2024/0092224 A1 Mar. 21, 2024

(30) Foreign Application Priority Data

Sep. 21, 2022 (KR) ........................ 10-2022-0119019

(51) Int. Cl.
| | |
|---|---|
| *B60L 58/40* | (2019.01) |
| *B60L 50/70* | (2019.01) |
| *B60L 53/22* | (2019.01) |
| *H02M 1/00* | (2007.01) |
| *H02M 3/158* | (2006.01) |

(52) U.S. Cl.
CPC .............. *B60L 58/40* (2019.02); *B60L 50/70* (2019.02); *B60L 53/22* (2019.02); *B60L*
*2210/10* (2013.01); *H02M 1/0032* (2021.05); *H02M 3/1582* (2013.01); *H02M 3/1584* (2013.01)

(58) Field of Classification Search
CPC .......... B60L 58/40; B60L 50/75; B60L 53/22; B60L 53/20; B60L 50/60; B60L 50/70; B60L 2210/10; B60L 2210/14; H02M 3/1584; H02M 3/1582; H02M 1/0032
See application file for complete search history.

(56) References Cited

U.S. PATENT DOCUMENTS

| | | | |
|---|---|---|---|
| 2015/0222191 A1* | 8/2015 | Hosoda | H02M 3/3376 363/21.01 |
| 2017/0244336 A1* | 8/2017 | Kitamoto | H01M 8/04828 |
| 2018/0236893 A1* | 8/2018 | Matsumoto | H02M 3/155 |

(Continued)

FOREIGN PATENT DOCUMENTS

| | | |
|---|---|---|
| EP | 3 682 525 A1 | 7/2020 |
| JP | 2008-141802 A | 6/2008 |
| JP | 2009-159798 A | 7/2009 |

(Continued)

*Primary Examiner* — Monica Lewis
*Assistant Examiner* — Ularislao Cordova
(74) *Attorney, Agent, or Firm* — Morgan, Lewis & Bockius LLP

(57) ABSTRACT

A method for controlling a vehicle includes determining the number of driving legs according to an output current target value of a DC-DC converter; selecting one or more legs to be switched as many as the number of the driving legs from among a plurality of legs included in the DC-DC converter based on accumulated operation time for each of the plurality of legs; and controlling an output current value of the DC-DC converter to follow the output current target value by switching the selected one or more legs.

16 Claims, 5 Drawing Sheets

(56)  References Cited

U.S. PATENT DOCUMENTS

2020/0070643 A1    3/2020  Huh et al.

FOREIGN PATENT DOCUMENTS

| | | | |
|---|---|---|---|
| JP | 4611368 | B2 | 1/2011 |
| JP | 5404831 | B2 | 2/2014 |
| KR | 10-2010-0004024 | A | 1/2010 |
| KR | 10-1538017 | B1 | 7/2015 |
| KR | 10-2015-0142743 | A | 12/2015 |
| KR | 10-1630833 | B1 | 6/2016 |
| KR | 10-2020-0123889 | A | 11/2020 |
| WO | 2019/053370 | A1 | 3/2019 |

* cited by examiner

FIG. 3

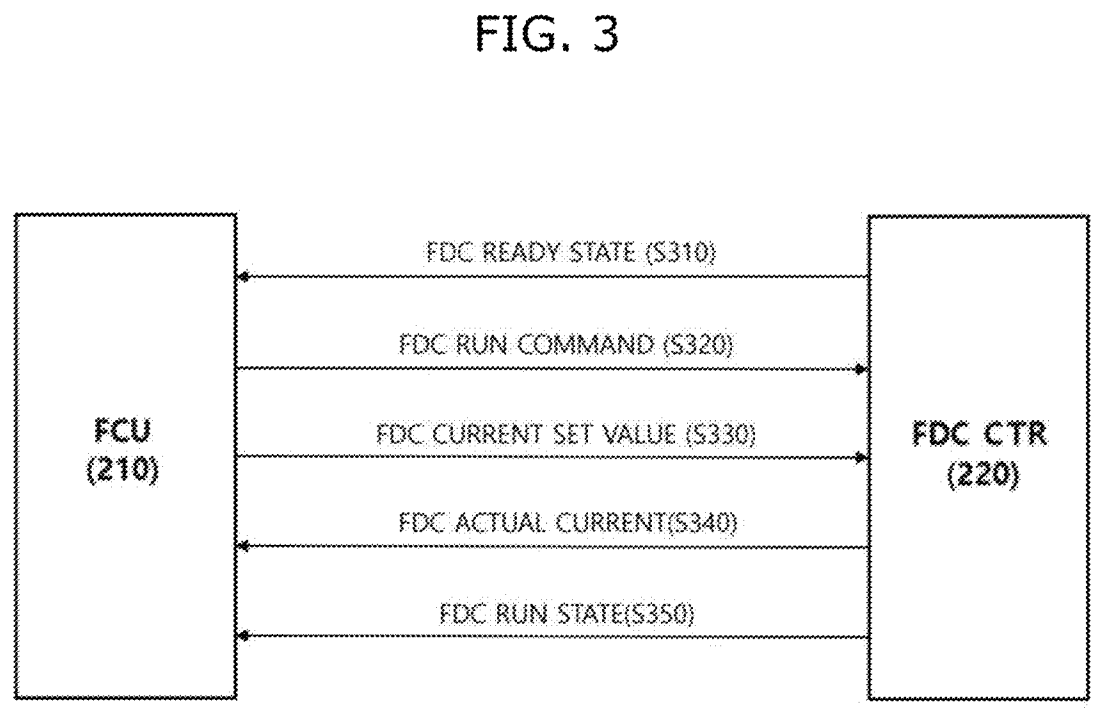

FDC CTR
(220)

FDC READY STATE (S310)

FDC RUN COMMAND (S320)

FDC CURRENT SET VALUE (S330)

FDC ACTUAL CURRENT(S340)

FDC RUN STATE(S350)

FCU
(210)

VEHICLE INCLUDING DC-DC CONVERTER AND METHOD OF CONTROLLING FOR THE SAME

CROSS REFERENCE TO RELATED APPLICATION

The present application claims priority of Korean Patent Application No. 10-2022-0119019 filed on Sep. 21, 2022, the entire contents of which are incorporated herein for all purposes by this reference.

TECHNICAL FIELD

The present disclosure relates to a vehicle with improved efficiency and durability performance of a DC-DC converter, and a method for controlling the same.

BACKGROUND

Recently, as interest in the environment increases, the development of an electrification vehicle having a motor as a driving source is being actively conducted. An example of such an electrification vehicle may be a fuel cell electric vehicle (FCEV).

The fuel cell electric vehicle may refer to a vehicle which travels in such a way as to drive an electric motor with electric power generated through a chemical reaction between hydrogen and oxygen in the fuel cell. In order to stably supply power to a motor, a high voltage battery may be provided between a fuel cell and a motor driving system including an electric motor and an inverter, and there is a trend of increasing the voltage of the high voltage battery in order to increase efficiency and storage capacity.

Accordingly, the voltage of the high-voltage battery may become significantly higher than the voltage of the fuel cell, and in such case, a DC-DC converter may be disposed between the fuel cell and the high voltage battery to enable power exchange between the fuel cell and the high voltage battery.

The matters described above as the background art are only for facilitating a better understanding of the background of the present disclosure, and should not be taken as an acknowledgment that they correspond to the prior art already known to those of ordinary skill in the art.

SUMMARY

Accordingly, the technical object of the present disclosure is to improve the efficiency of the DC-DC converter by selecting legs to be switched from among the plurality of legs included in the DC-DC converter as many as the number according to an output current target value.

Additionally, another technical object of the present disclosure is to improve the durability performance of the DC-DC converter by balancing the accumulated operation time for each of a plurality of legs included in the DC-DC converter in selecting a leg to be switched.

Technical objects, which the present disclosure is to accomplish, are not limited to the aforementioned ones, and other technical objects not mentioned above may be clearly appreciated from the following detailed description by a person having ordinary skill in the art to which the present disclosure belongs.

As a means for accomplishing the above-described technical objects, a method for controlling a vehicle may include determining the number of driving legs according to an output current target value of a DC-DC converter; selecting one or more legs to be switched as many as the number of the driving legs from among a plurality of legs included in the DC-DC converter based on accumulated operation time for each of the plurality of legs; and controlling an output current value of the DC-DC converter to follow the output current target value by switching the selected one or more legs.

For example, the determining may include reading an efficiency map including information on a high-efficiency number of legs matching to each output current value of the DC-DC converter; and determining, as the number of the driving legs, the high-efficiency number of the legs for an output current value of the efficiency map corresponding to the output current target value.

For example, the high-efficiency number of the legs may match to the output current value of the DC-DC converter based on an output efficiency of the DC-DC converter.

For example, the method may further include ending running of the DC-DC converter when the output current target value does not correspond to the output current value of the efficiency map.

For example, the method may further include re-determining the number of the driving legs according to the output current target value when the output current target value fluctuates as much as a preset value or more while running of the DC-DC converter is continued.

For example, the selecting may include selecting the one or more legs to be switched as many as the number of the driving legs from among the plurality of legs in an order of a shortest accumulated operation time of the leg.

For example, the method may further include reading the accumulated operation time from a memory storing the accumulated operation time for each of the plurality of legs when the vehicle is started.

For example, the method may further include updating a switching time of the selected one or more legs to the accumulated operation time and storing the updated accumulated operation time in the memory, when ending running of the DC-DC converter.

For example, the method may further include receiving the output current target value together with a run command for the DC-DC converter.

Additionally, as a means for accomplishing the above-described technical objects, a vehicle may include a DC-DC converter including a plurality of legs; and a converter controller which determines the number of driving legs according to an output current target value of the DC-DC converter, selects one or more legs to be switched as many as the number of the driving legs from among the plurality of legs based on accumulated operation time for each of the plurality of legs, and controls an output current value of the DC-DC converter to follow the output current target value by switching the selected one or more legs.

For example, the converter controller may include a memory which stores an efficiency map including information on a high-efficiency number of legs matching to each output current value of the DC-DC converter, and may determine, as the number of the driving legs, the high-efficiency number of the legs for an output current value of the efficiency map corresponding to the output current target value.

For example, the high-efficiency number of the legs may match to the output current value of the DC-DC converter based on an output efficiency of the DC-DC converter.

For example, the converter controller may end running of the DC-DC converter when the output current target value does not correspond to the output current value of the efficiency map.

For example, the converter controller may re-determine the number of the driving legs according to the output current target value when the output current target value fluctuates as much as a preset value or more while running of the DC-DC converter is continued.

For example, the converter controller may select the one or more legs to be switched as many as the number of the driving legs from among the plurality of legs in an order of a shortest accumulated operation time of the leg.

For example, the converter controller may include a memory storing the accumulated operation time for each of the plurality of legs, and may read the accumulated operation time when the vehicle is started.

For example, the converter controller may update a switching time of the selected one or more legs to the accumulated operation time and store the updated accumulated operation time in the memory, when ending running of the DC-DC converter.

For example, the converter controller may receive the output current target value together with a run command for the DC-DC converter.

According to the present disclosure, it is possible to improve the efficiency of the DC-DC converter by selecting the legs to be switched from among the plurality of legs included in the DC-DC converter as many as the number according to the output current target value.

Additionally, according to the present disclosure, it is possible to improve the durability performance of the DC-DC converter by balancing the accumulated operation time for each of a plurality of legs included in the DC-DC converter in selecting a leg to be switched.

Advantageous effects which can be obtained from the present disclosure are not limited to the aforementioned ones, and other advantageous effects not mentioned above can be understood from the following detailed description by a person having ordinary skill in the art to which the disclosure belongs.

BRIEF DESCRIPTION OF THE DRAWINGS

The following drawings accompanying this specification illustrate preferred embodiments of the present disclosure, and serve to facilitate a better understanding of the technical spirit of the present disclosure together with the detailed description of the present disclosure to be described later, so the present disclosure should not be construed as being limited only to the matters described in such drawings.

FIG. 3 shows an example of an operation process of a fuel cell control unit and a converter controller according to an embodiment of the present disclosure.

DETAILED DESCRIPTION OF THE DISCLOSURE

Figure 1:
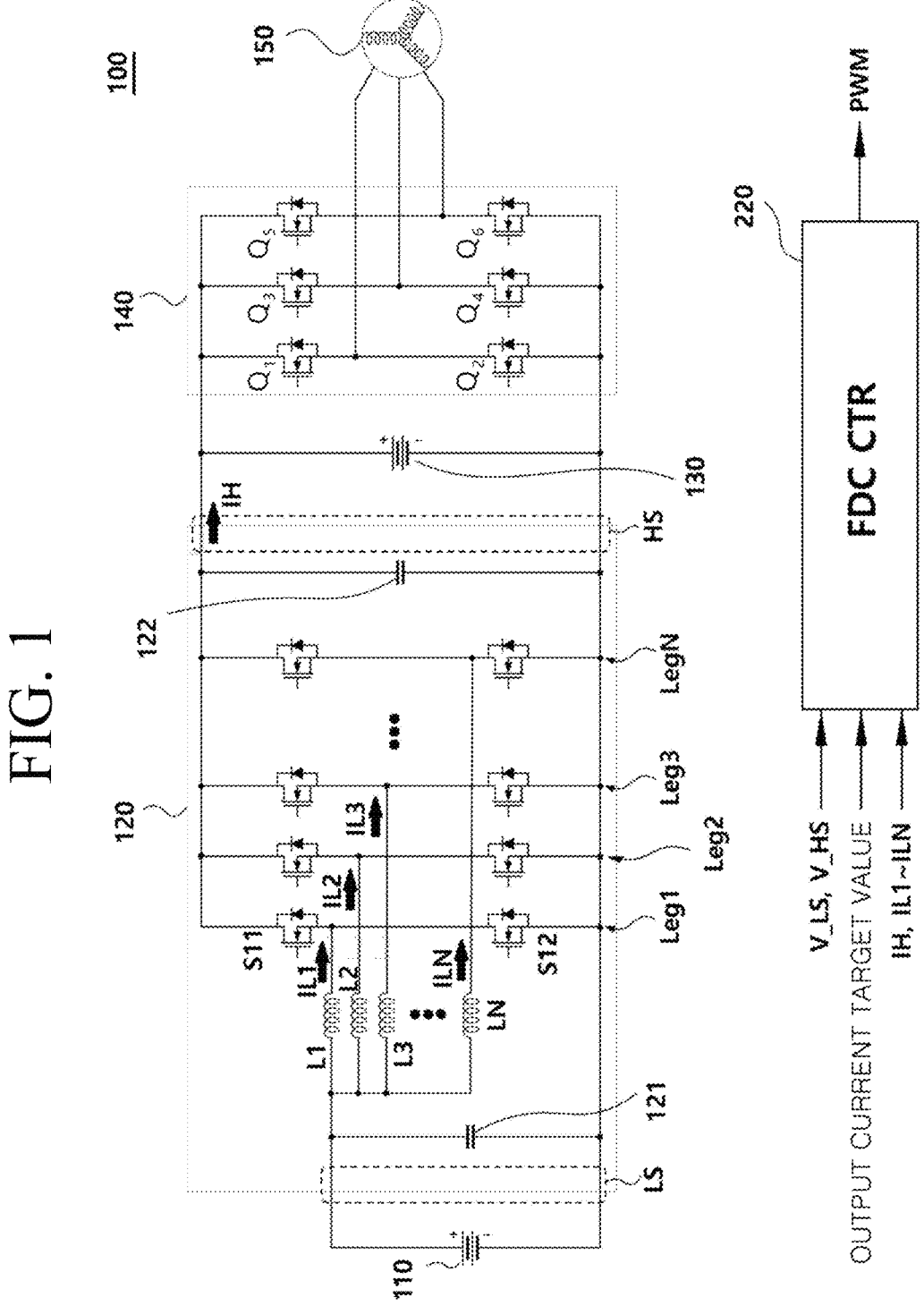
FIG. 1 shows an example of the configuration of a power electronic system of a fuel cell electric vehicle according to an embodiment of the present disclosure.

Hereinafter, exemplary embodiments disclosed herein will be described with reference to the accompanying drawings, in which identical or like components are given like reference numerals regardless of drawing numbers, and description thereof will not be repeated. Suffixes for components, "module", "unit" and "part" used in the following description, will be given or used in place of each other taking only easiness of specification preparation into consideration, and they do not have distinguishable meanings or roles by themselves. Additionally, in describing the embodiments disclosed herein, it is noted that the detailed description for related known arts may be omitted herein so as not to obscure essential points of the disclosure. Further, the accompanying drawings are intended to facilitate a better understanding of examples disclosed herein, and the technical spirit disclosed herein is not limited by the accompanying drawings, and rather should be construed as including all the modifications, equivalents and substitutes within the technical idea and technical scope of the disclosure.

The terms including ordinal number such as, first, second and the like may be used to explain various components, but the components should not be limited by these terms. Said terms are used in order only to distinguish one component from another component.

Further, when one component is referred to as being "connected" or "accessed" to another element, it should be understood that the one component may be directly connected or accessed to the other component or any intervening component may also be present therebetween. Contrarily, when one component is referred to as being "directly connected" or "directly accessed" to another component, it should be understood as that no other element is present therebetween.

Singular expressions may include the meaning of plural expressions unless the context clearly indicates otherwise.

Terms such as "include (or comprise)", "have (or be provided with)", and the like are intended to indicate that features, numbers, steps, operations, components, parts, or combinations thereof written in the following description exist, and thus should not be understood as that the possibility of existence or addition of one or more different features, numbers, steps, operations, components, parts, or combinations thereof is excluded in advance.

Additionally, a unit or a control unit included in the names of a motor control unit (MCU), a hybrid control unit (HCU), and the like is only a term widely used in the naming of a controller that controls a specific vehicle function. However, it does not mean a generic function unit. For example, each controller may include is a communication apparatus that communicates with other controllers or sensors to control the functions which it is responsible for, a memory that stores operating system or logic instructions, input/output information, and the like, and one or more processors that perform judgments, calculations, decisions, and the like necessary to control the functions which it is responsible for.

The following embodiments will be described under the assumption that the DC-DC converter is applied to a hydrogen fuel cell electric vehicle, but this is for convenience of description and it is apparent to those skilled in the art that it can be applied to a vehicle including a DC-DC converter having a plurality of legs as well as the hydrogen fuel cell electric vehicle.

FIG. 1 shows an example of the configuration of a power electronic system of a fuel cell electric vehicle according to an embodiment of the present disclosure.

Referring to FIG. 1, a fuel cell electric vehicle 100 according to an embodiment may include a fuel cell 110, a fuel cell DC-DC converter (FDC) 120 with one end to which the fuel cell 110 is connected, a high voltage battery 130 connected to the other end of the DC-DC converter 120, an inverter 140 with a DC-link connected to the other end of the DC-DC converter 120, and a motor 150 connected to an AC-link of the inverter 140.

The fuel cell 110 may output power through a chemical reaction between hydrogen and oxygen. For example, the fuel cell 110 may have a form of a polymer electrolyte membrane fuel cell (PEMFC: Polymer Electrolyte Membrane Fuel Cell, Proton Exchange Membrane Fuel Cell), but this is exemplary and is not necessarily limited thereto.

The DC-DC converter 120 has two DC-links, that is, one end electrically connected to the fuel cell 110, and the other end electrically connected to the high voltage battery 130, and may perform a function of transforming the voltage of power inputted from one end to correspond to the voltage of the other end and outputting the voltage to the other end. Additionally, the DC-DC converter 120 may perform a function of transforming the voltage of power inputted from the other end to correspond to the voltage of one end, and of outputting it at one end. To this end, the DC-DC converter 120 may include a first capacitor for stably maintaining the voltage at one end, a second capacitor for stably maintaining the voltage at the other end, and a plurality of inductor-leg pairs forming a buck-boost topology for bidirectional transformation between one end and the other end.

Here, assuming that the normal voltage range of the fuel cell is relatively lower than the normal voltage range of the high voltage battery 130, one end may be referred to as a low side LS, and the other end may be referred to as a high side HS. The first capacitor may be connected between the negative (−) terminal and the positive (+) terminal of the low side LS, and the second capacitor 122 may be connected between the negative (−) terminal and the positive (+) terminal of the high side HS. Here, the first capacitor 121 may be referred to as a 'low-side capacitor', and the second capacitor 122 may be referred to as a 'high-side capacitor'.

Also, the plurality (N) of inductor-leg pairs may be connected in parallel between the low-side capacitor 121 and the high-side capacitor 122. In more detail, one end of each of N inductors L1, L2, L3, . . . , LN may be connected to the positive (+) terminal of the low side LS, and the other end thereof may be connected to a corresponding one of a plurality of legs Leg1, Leg2, Leg3, . . . , LegN to form inductor-leg pairs.

Each of the plurality of legs Leg1, Leg2, Leg3, . . . , LegN may include two switching elements interconnected in series between both ends of the high-side capacitor 122, and the connection node of the two switching elements may be connected to the other end of the inductor constituting the inductor-leg pair. For example, the first leg Leg1 includes the first switching element S11 and the second switching element S12 connected in series between both ends of the high-side capacitor 122, and the connection node of the two switching elements S11, S12 may be connected to the other end of the first inductor L1 to form the first inductor-leg pair L1-Leg1. The first switching element S11 may be referred to as a 'top switching element', and the second switching element S12 may be referred to as a 'bottom switching element'.

Each switching element may be implemented as a power semiconductor device capable of high-power and high-speed switching, for example, an insulated gate bipolar transistor (IGBT), but is not limited thereto.

The converter controller 220 may control the states of the switching elements constituting each leg Leg1, Leg2, Leg3, . . . , LegN through pulse width modulation PWM based on low-side currents IL1, IL2, IL3, . . . ILN, a high-side current IH, a voltage across the low-side capacitor 121 (V_LS), a voltage across the high-side capacitor 122 (V_HS) and output current target value.

To this end, the converter controller 220 may include a current sensing circuit (not shown) for processing the current values sensed at the low side LS and the high side HS, a voltage sensing circuit (not shown) for processing the voltage values sensed at the low side and the high side respectively, a microcomputer (not shown) for controlling the operation of the DC-DC converter 120 by using the sensed values, and a PWM output circuit (not shown) for outputting a pulse width modulation signal PWM for switching the switching elements Q1-Q6. In this case, the microcomputer may control the duty ratio of the plurality of legs (Leg1, Leg2, Leg3, . . . , LegN) or the like such that the output current value of the DC-DC converter 120 follows the output current target value of the DC-DC converter 120. Here, the output current target value of the DC-DC converter 120 may be information transmitted from a fuel cell control unit (FCU) to be described later. According to an embodiment, the converter controller 220 and the DC-DC converter 120 may be implemented as an integrated module.

The inverter 140 may convert the DC power of the high voltage battery 130 into multi-phase AC power to drive the motor 150, or convert the AC power generated by the motor 150 into DC power and transmit it to the high voltage battery 130. To this end, the inverter may have a plurality of legs corresponding to each of the multi-phases. Since it is apparent to those skilled in the art that the multi-phase motor and the inverter for driving the same may be implemented in various configurations, a further detailed description thereof will be omitted.

Based on the configuration of the power electronic system described above with reference to FIG. 1, a control system of the fuel cell electric vehicle will be described with reference to FIG. 2.

Figure 2:
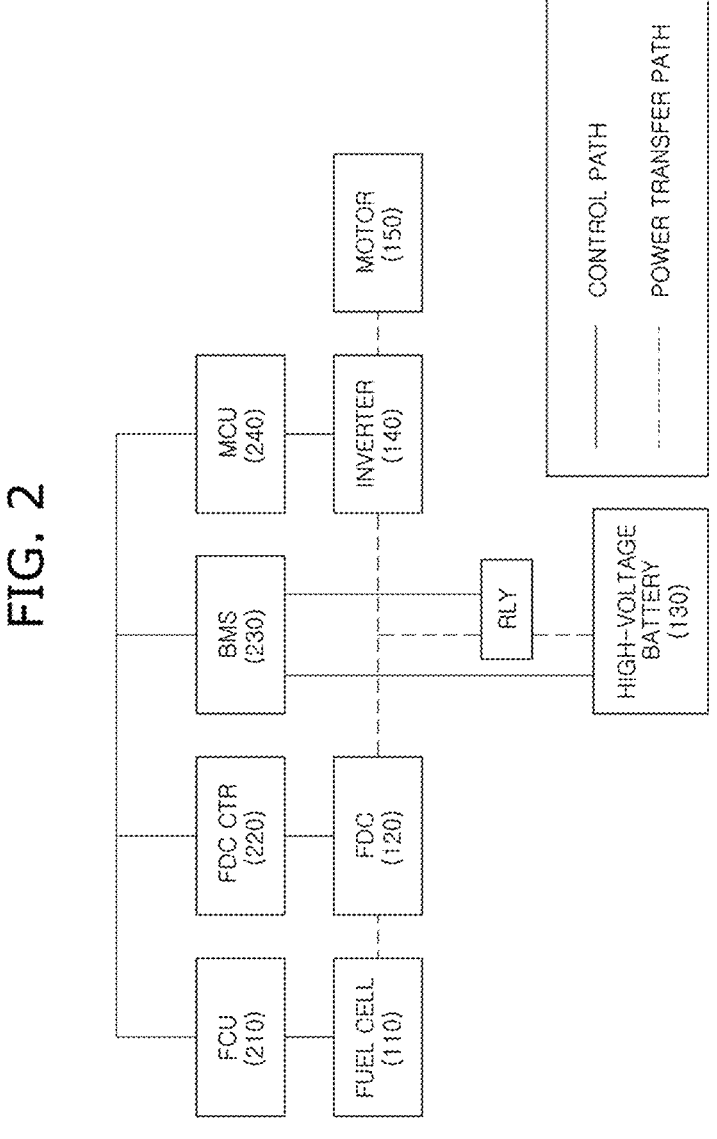
FIG. 2 shows an example of the configuration of a control system of a fuel cell electric vehicle according to an embodiment of the present disclosure.

FIG. 2 is a view showing a control system of a fuel cell electric vehicle according to an embodiment of the present disclosure together with a power electronic system.

In FIG. 2, a solid line connecting between respective components indicates a control signal transmission path, and a dotted line indicates a power transmission path, respectively. In addition, in the description of FIG. 2, since the power transmission path is the same as that described with reference to FIG. 1, the overlapping description will be omitted.

Referring to FIG. 2, the fuel cell 110 may be controlled by the fuel cell control unit (FCU) 210, and the control of the DC-DC converter may be performed by the converter controller 220. In addition, the battery control management system (BMS) 230 may control the ON/OFF state of the relay RLY, and manage the state of the high voltage battery 130.

In addition, a motor control unit (MCU, 240) may control a gate drive unit (not shown) with a control signal in the form of pulse width modulation (PWM) based on the motor angle of the motor 150, phase voltage, phase current, required torque, or the like, and the gate driving unit may accordingly control the inverter 140 driving the motor 150.

The respective control entities 210, 220, 230, and 240 may exchange with each other information or commands required for control through communication according to a predetermined vehicle communication protocol, for example, controller area network (CAN) communication.

FIG. 3 shows an example of an operation process of the fuel cell control unit 210 and the converter controller 220 according to an embodiment of the present disclosure.

Referring to FIG. 3, the converter controller 220 transmits an operation ready state FDC READY STATE of the DC-DC converter 120 to the fuel cell control unit 210 (S310). When the operation ready state of the DC-DC converter 120 becomes on, the fuel cell control unit 210 transmits a run command FDC RUN COMMAND (S320). At this time, the output current target value FDC CURRENT SET VALUE may also be transmitted (S330). Accordingly, the converter controller 220 drives the DC-DC converter 120 for the satisfaction of the output current target value, and as a result, the output current value FDC ACTUAL CURRENT of the DC-DC converter 120 is actually transmitted to the fuel cell control unit 210 (S340). Also, the converter controller 220 may transmit the operation state FDC RUN STATE of the DC-DC converter to the fuel cell control unit 210 (S350).

Figure 4:
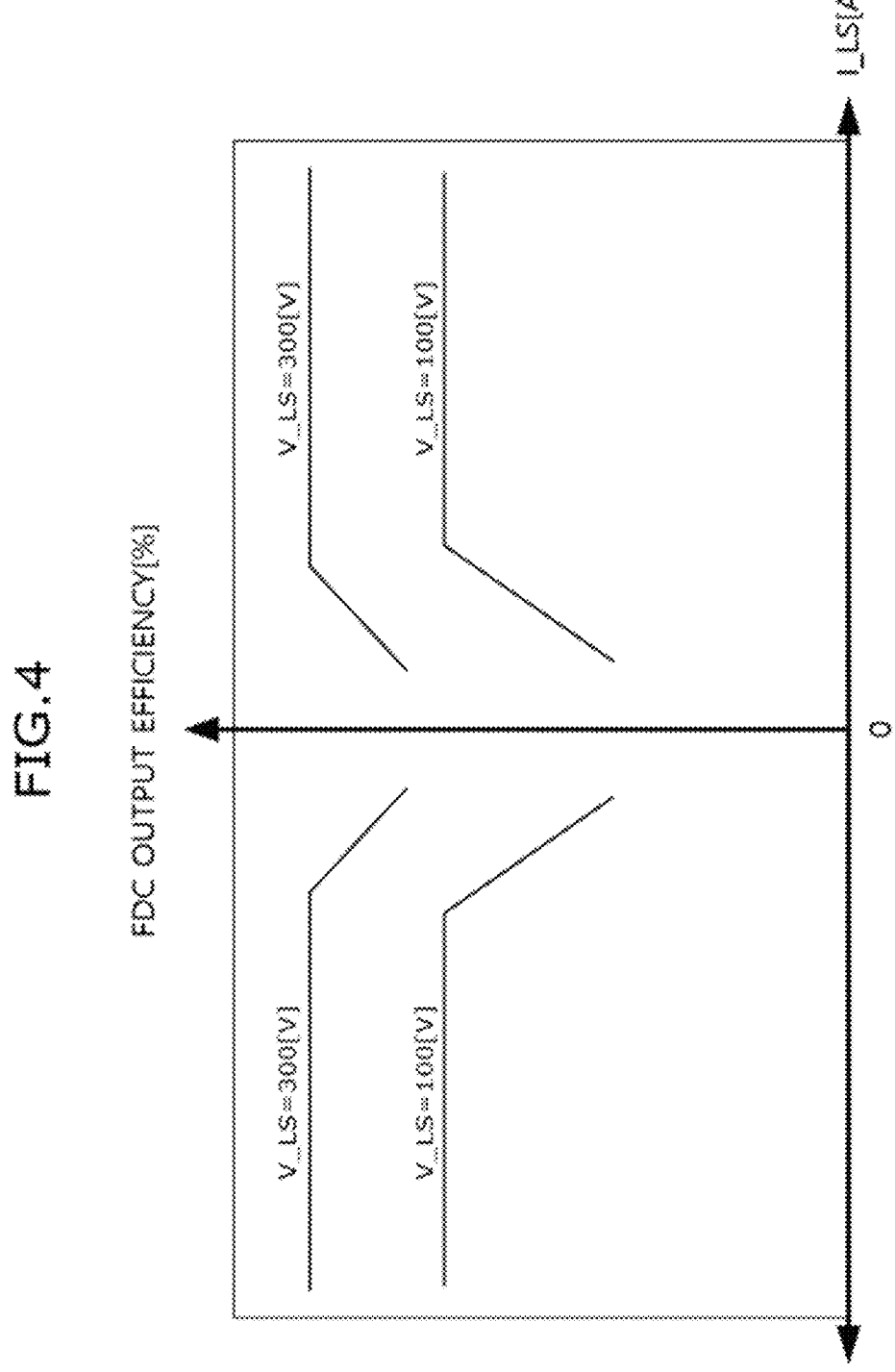
FIG. 4 shows an example of an output efficiency curve of a DC-DC converter according to an embodiment of the present disclosure.

FIG. 4 shows an example of an output efficiency curve of a DC-DC converter according to an embodiment of the present disclosure.

Referring to FIG. 4, the output efficiency of the DC-DC converter 120 (FDC) may decrease with the decreasing absolute value of the low-side current I_LS, regardless of the voltage V_LS between both ends of the low-side capacitor 121.

In the DC-DC converter 120, since the output efficiency decreases as the value of the low-side current I_LS, that is, the output current value of the DC-DC converter 120 decreases, each of the plurality of legs Leg1, Leg2, Leg3, . . . LegN included in the DC-DC converter 120 may also have lower output efficiency in the low current output section compared to the high current output section.

Accordingly, in the present embodiment, the converter controller 220 may control the leg switched in the DC-DC converter 120 to be driven in the high current output section, by selecting legs to be switched from among the plurality of legs Leg1, Leg2, Leg3, . . . , LegN as many as the number according to the output current target value with reference to the efficiency map for the DC-DC converter 120. Accordingly, the efficiency of the DC-DC converter 120 may be improved.

For example, when the output current target value is 80 (A) and the number of the plurality of legs is 8, the converter controller does not control the output current of the DC-DC converter 120 to follow 80(A) by switching the eight legs, but may control the output current of the DC-DC converter 120 to follow 80(A) by switching the two legs selected according to the efficiency map. Accordingly, the two legs selected according to the efficiency map may be driven in the high current output section.

Meanwhile, when the converter controller 220 switches only some of the plurality of legs Leg1, Leg2, Leg3, . . . LegN, the switched time, that is, the accumulated operation time, may be different for each of the plurality of legs Leg1, Leg2, Leg3, . . . , LegN included in the DC-DC converter 120.

Since the switching element included in the leg degrades as the accumulated operation time increases, the DC-DC converter 120 may be in a fault state due to degradation of a particular leg when the accumulated operation times of the plurality of legs (Leg1, Leg2, Leg3, . . . , LegN) are not balanced.

Accordingly, in this embodiment, when selecting a leg to be switched, the converter controller 220 may balance the accumulated operation times for the plurality of legs (Leg1, Leg2, Leg3, . . . , LegN) in order to improve the durability performance of the DC-DC converter 120.

An operation method in which the converter controller 220 selects legs to be switched as many as the number according to the output current target value based on the accumulated operation time for each of the plurality of legs Leg1, Leg2, Leg3, . . . , LegN will be described with reference to FIG. 5.

Figure 5:
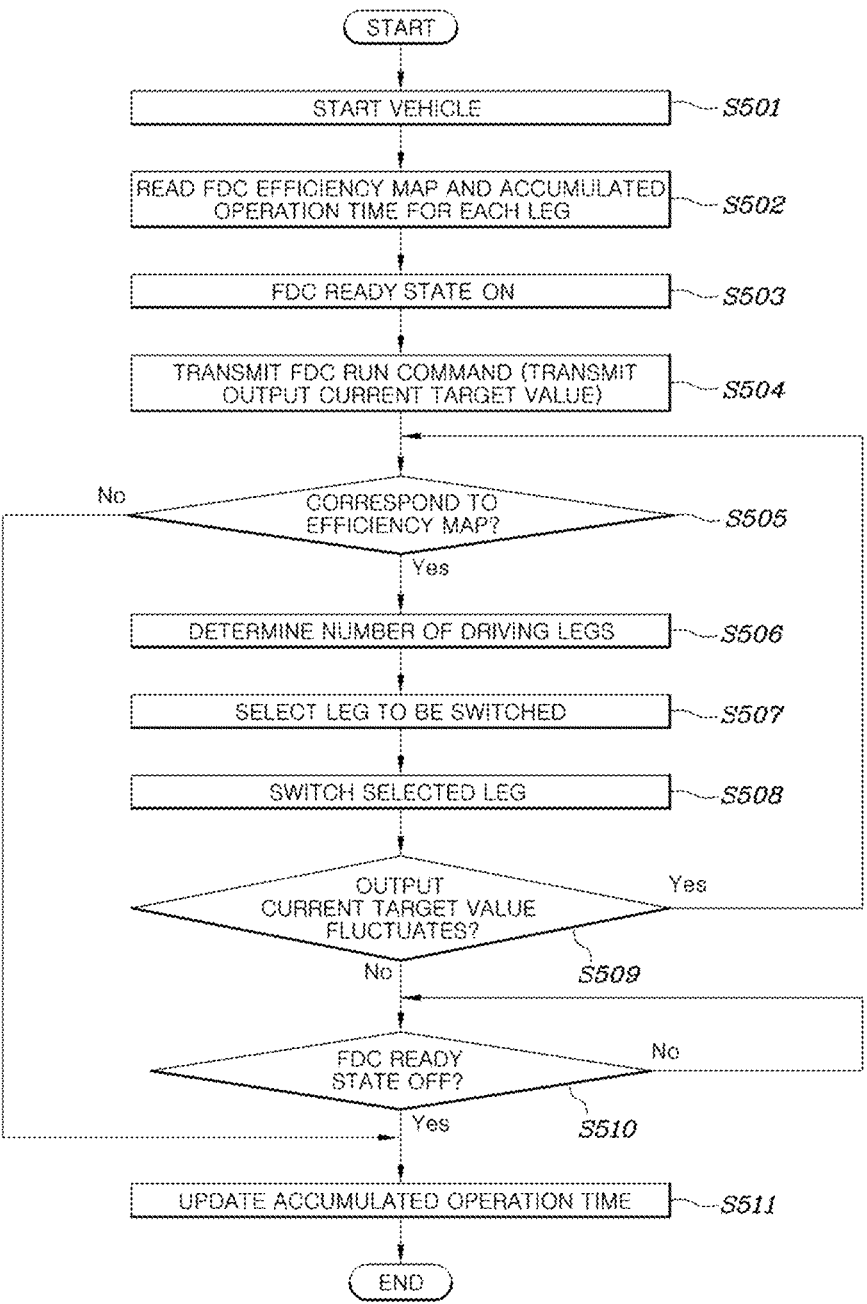
FIG. 5 is a flowchart illustrating an example of a control process of a fuel cell electric vehicle according to an embodiment of the present disclosure.

FIG. 5 is a flowchart for explaining a method for controlling a fuel cell electric vehicle according to an embodiment of the present disclosure.

Referring to FIG. 5, as the IG KEY becomes on, the vehicle start may be in an on state (S501).

When the vehicle is started, the converter control unit 220 may read the efficiency map of the DC-DC converter 120 and the accumulated operation time for each leg Leg1, Leg2, Leg3, . . . , LegN from the memory (S502).

More specifically, the converter controller 220 may include a memory for storing the efficiency map of the DC-DC converter 120 and the accumulated operation time for each of the plurality of legs Leg1, Leg2, Leg3, . . . LegN, and may read the efficiency map of the DC-DC converter 120 and the accumulated operation time for each of the plurality of legs Leg1, Leg2, Leg3, . . . , LegN, which are stored in the memory, when the vehicle is started.

In this case, the efficiency map of the DC-DC converter 120 may include information on the high-efficiency number of legs matching to each output current value of the DC-DC converter 120. The high-efficiency number of legs may match to an output current value of the DC-DC converter 120 based on the output efficiency of the DC-DC converter 120. As described above, the output efficiency of the DC-DC converter 120 may be lower as the output current value of the DC-DC converter 120 is lower. In this case, the output current of the DC-DC converter 120 may mean a current outputted from the low side of the DC-DC converter 120.

Thereafter, the operation ready state FDC READY STATE of the DC-DC converter 120 becomes on (S503), and the fuel cell control unit may transmit the run command FDC RUN COMMAND for the DC-DC converter 120 to the converter controller 220 (S504). As described above, the fuel cell control unit 210 may output the output current target value FDC CURRENT SET VALUE for the DC-DC converter 120 together with the run command FDC RUN COMMAND for the DC-DC converter 120 to the converter controller 220.

When the run command FDC RUN COMMAND is inputted, the converter controller 220 may determine whether the output current target value FDC CURRENT SET VALUE corresponds to the output current value of the efficiency map which has been read in S502 (S505).

When the output current target value does not correspond to the output current value of the efficiency map (NO in S505), the converter controller 220 may determine that the output current target value is excessive (or too small), and may end the running of the DC-DC converter 120. Thereafter, operation S511 may be performed.

When the output current target value corresponds to the output current value of the efficiency map (YES in S505), the converter controller 220 may determine the number of driving legs according to the output current target value of the DC-DC converter 120 (S506). More specifically, the converter controller 220 may determine the high-efficiency number of legs for the output current value of the efficiency map corresponding to the output current target value as the number of driving legs.

The converter controller 220 may select the legs to be switched from among the plurality of legs Leg1, Leg2, Leg3, . . . , LegN as many as the number of the driving legs according to the accumulated operation time which has been read in S502 (S507). More specifically, the converter controller 220 may select the legs to be switched from among the plurality of legs Leg1, Leg2, Leg3, . . . , LegN as many as the number of driving legs in the order of the shortest accumulated operation time of the leg which has been read in S502.

Thereafter, the converter controller 220 may switch at least one leg selected in S507 from among the plurality of legs Leg1, Leg2, Leg3, . . . , LegN (S508). More specifically, the converter controller 220 may control the output current value of the DC-DC converter 120 to follow the output current target value by switching the at least one leg selected in S507. In this case, the operation state FDC RUN STATE of the DC-DC converter 120 may become on.

The converter controller 220 may determine whether the output current target value inputted from the fuel cell control unit 210 fluctuates as much as a preset value or more based on the efficiency map in the running state of the DC-DC converter 120 (S509).

When the output current target value fluctuates as much as the preset value or more while the running of the DC-DC converter 120 is continued (YES in S509), the converter controller 220 may re-determine the number of driving legs according to the output current target value (S505-S506).

When the output current target value fluctuates less than a preset value while the running of the DC-DC converter 120 is continued (NO in S509), it may be determined whether the running of the DC-DC converter 120 is terminated as the operation ready state (FDC READY STATE) of the DC-DC converter 120 becomes off (S510).

When the running of the DC-DC converter 120 is terminated (YES in S510), the converter controller 220 may update the switching time of at least one leg selected in S507 to the accumulated operation time, and may store the updated accumulated operation time for each of the plurality of legs Leg1, Leg2, Leg3, . . . , LegN in the memory (S511).

Meanwhile, the disclosure described above may be embodied as a computer-readable code in a non-transitory computer-readable medium in which program is recorded. The non-transitory computer-readable medium includes all kinds of recorders where data that can be read by a computer system is stored. Examples of computer-readable media are hard disk drives (HDDs), solid state disks (SSDs), Silicon disk drives (SDDs), ROMs, RAMs, CD-ROMs, magnetic tape, floppy disks, optical data storage devices, and the like.

The converter controller 220 may include a processor or a microprocessor. When the processor or the microprocessor reads and executes the computer readable code stored in the non-transitory computer-readable medium, the processor or the microprocessor may be configured to perform the above-described operations/method.

The detailed description above should not be interpreted in a limited way but should be considered as an example. The scope of the disclosure shall be determined by a reasonable interpretation of the claims attached, and all changes within the equivalent range of the disclosure are within the scope of the disclosure.

What is claimed is:

1. A method for controlling a vehicle, the method comprising:

determining a number of driving legs according to an output current target value of a DC-DC converter;

selecting one or more legs to be switched from among a plurality of legs included in the DC-DC converter based on accumulated operation time for each of the plurality of legs and the determined number of driving legs; and controlling an output current value of the DC-DC converter to follow the output current target value by switching the selected one or more legs, wherein the determining comprises:

reading an efficiency map including information on a high-efficiency number of legs matching to each output current value of the DC-DC converter; and determining, as the number of the driving legs, the high-efficiency number of the legs for an output current value of the efficiency map corresponding to the output current target value.

2. The method of claim 1, wherein the high-efficiency number of the legs matches to the output current value of the DC-DC converter based on an output efficiency of the DC-DC converter.

3. The method of claim 1, further comprising ending running of the DC-DC converter when the output current target value does not correspond to the output current value of the efficiency map.

4. The method of claim 1, further comprising re-determining the number of the driving legs according to the output current target value when the output current target value fluctuates as much as a preset value or more while running of the DC-DC converter is continued.

5. The method of claim 1, wherein the selecting comprises selecting the one or more legs to be switched from among the plurality of legs in an order of a shortest accumulated operation time of the leg.

6. The method of claim 1, further comprising reading the accumulated operation time from a memory storing the accumulated operation time for each of the plurality of legs when the vehicle is started.

7. The method of claim 6, further comprising updating a switching time of the selected one or more legs to the accumulated operation time and storing the updated accumulated operation time in the memory, when ending running of the DC-DC converter.

8. The method of claim 1, further comprising receiving the output current target value together with a run command for the DC-DC converter.

9. A vehicle comprising:

a DC-DC converter including a plurality of legs; and a converter controller which determines a number of driving legs according to an output current target value of the DC-DC converter, selects one or more legs to be switched from among the plurality of legs based on accumulated operation time for each of the plurality of legs and the determined number of driving legs, and controls an output current value of the DC-DC converter to follow the output current target value by switching the selected one or more legs, wherein the converter controller includes a memory which stores an efficiency map including information on a high-efficiency number of legs matching to each output current value of the DC-DC converter, and the converter controller determines, as the number of the driving legs, the high-efficiency number of the legs for an output current value of the efficiency map corresponding to the output current target value.

10. The vehicle of claim 9, wherein the high-efficiency number of the legs matches to the output current value of the DC-DC converter based on an output efficiency of the DC-DC converter.

11. The vehicle of claim 9, wherein the converter controller ends running of the DC-DC converter when the output current target value does not correspond to the output current value of the efficiency map.

12. The vehicle of claim 9, wherein the converter controller re-determines the number of the driving legs according to the output current target value when the output current target value fluctuates as much as a preset value or more while running of the DC-DC converter is continued.

13. The vehicle of claim 9, wherein the converter controller selects the one or more legs to be switched from among the plurality of legs in an order of a shortest accumulated operation time of the leg.

14. The vehicle of claim 9, wherein the converter controller includes a memory storing the accumulated operation time for each of the plurality of legs; and the converter controller reads the accumulated operation time from the memory when the vehicle is started.

15. The vehicle of claim 14, wherein the converter controller updates a switching time of the selected one or more legs to the accumulated operation time and stores the updated accumulated operation time in the memory, when ending running of the DC-DC converter.

16. The vehicle of claim 9, wherein the converter controller receives the output current target value together with a run command for the DC-DC converter.

\* \* \* \* \*